April 19, 1966     A. R. HACKER ETAL     3,246,735
CONVEYOR BELT WITH WIRE DISPERSED THEREIN
Filed Dec. 16, 1963
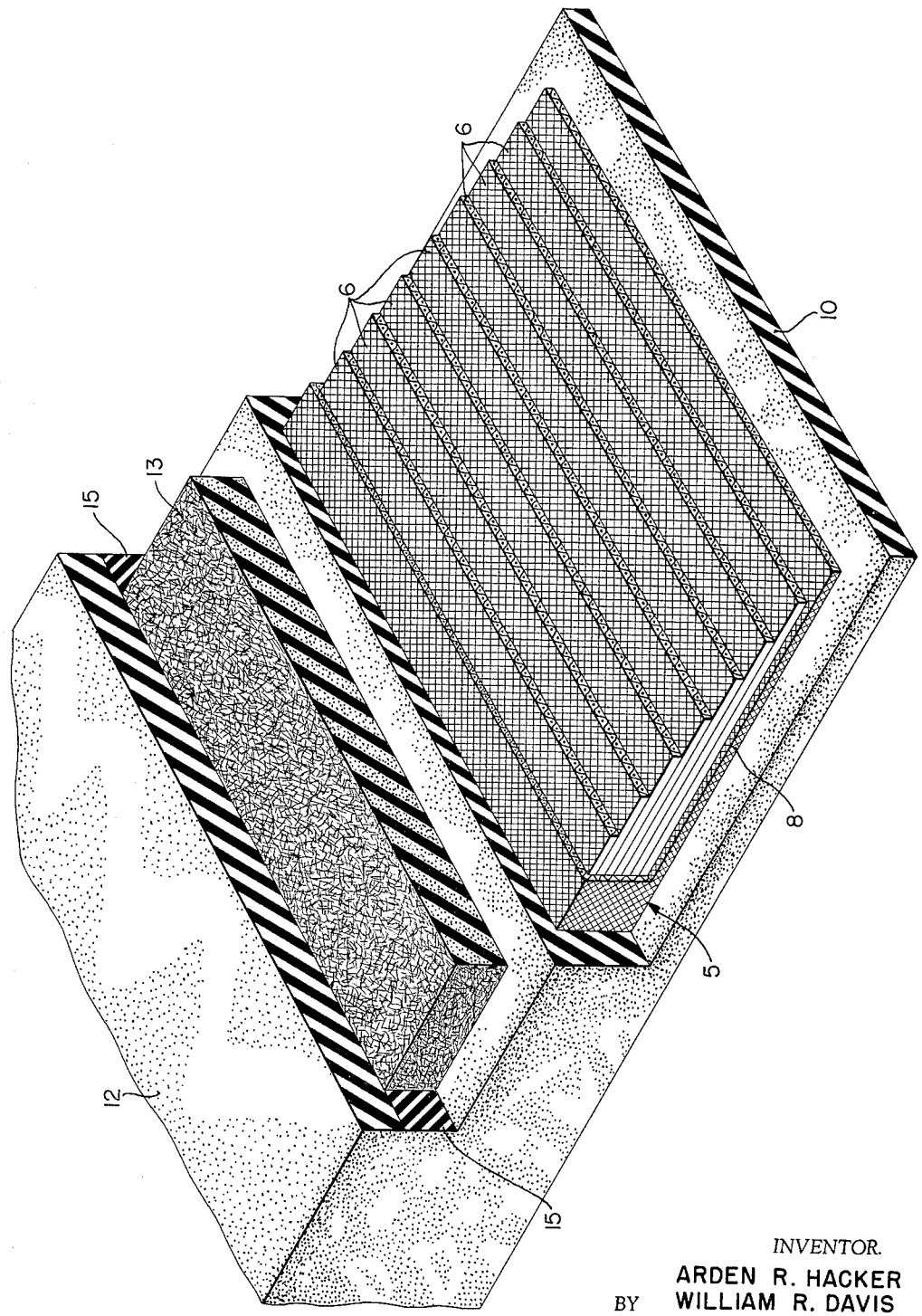
INVENTOR.
ARDEN R. HACKER
BY WILLIAM R. DAVIS
J. B. Holden
ATTORNEY

United States Patent Office 3,246,735
Patented Apr. 19, 1966

3,246,735
CONVEYOR BELT WITH WIRE DISPERSED THEREIN
Arden R. Hacker, Kent, and William R. Davis, Akron, Ohio, assignors to The Goodyear Tire & Rubber Company, Akron, Ohio, a corporation of Ohio
Filed Dec. 16, 1963, Ser. No. 330,941
7 Claims. (Cl. 198—193)

This invention relates to a conveyor belt whose carrying side cover contains a layer of rubber containing short lengths of wire near the top surface. The gauge of this layer varies depending upon the overall cover gauge. Its purpose is to protect the belt carcass against penetration of foreign objects such as pieces of steel or large rocks or other items dropped or placed on the belt for conveyance thereon. This layer tends to reduce severity of cuts sustained by the belt in normal usage and inhibits cut growth.

The wire is of any suitable composition and is usually brass-coated to form a bond with the rubber. The pieces may, for example, be .0025 to .015 gauge and about ⅜-inch to 1 inch in length. They are dispersed in rubber in any suitable amount, as for example, 10 to 25 percent, based on the weight of the rubber. The rubber layer containing the wire is preferably placed beneath an all-rubber cover although it may extend to the belt surface.

The wire pieces are advantageously incorporated in the rubber on a mill. The wire-containing layer can be sheeted from the mill in different gauges, and any total gauge can be produced by plying up several layers. Usually the wire pieces are dispersed uniformly throughout the rubber layer. This layer may extend the full belt width or it may stop short of the belt edge and the full width be completed by insertion of narrow rubber strips to prevent exposure of the wire at the belt edge.

The wire-containing layer of this invention may be incorporated in any conveyor-type belt known to the art.

The invention is further described in connection with the accompanying drawing which is a sectionalized, largely diagrammatic illustration of a particular belt, illustrative of the invention.

In the drawing, the carcass 5 of the belt is composed of seven plies 6 of the square-woven fabric enclosed in a breaker 8. The square-woven fabric is made of rayon warp and nylon weft. The breaker is a cord-type fabric. The fabrics 6 and 8 may be of other constructions. The number and type of plies in the carcass are optional. Each of the plies 6 is coated with rubber, and the breaker is coated with rubber.

Under the carcass is the rubber pulley cover 10. Between the carcass 5 and the top cover 12 is the layer 13, composed of about 12 percent, by weight, of ½-inch pieces of brass-coated wire of .0058 gauge uniformly dispersed in rubber. Along each side of the layer 13 is a narrow strip 15 of rubber which prevents ends of the wire from being exposed at the edges of the belt. Similar strips (not shown) are located along the edges of the carcass. A rubber layer usually of the same composition as the cover 12 separates the layer 13 from the carcass 5.

The belt may be of any desired width. The over-all thickness will depend upon the type of service contemplated. The top surface of the belt may be smooth or rough as is known in the prior art.

The invention is disclosed in the claims which follow. What we claim is:

1. A conveyor belt comprising (1) a pulley cover at the bottom surface of the belt and (2) a layer of rubber containing short lengths of wire dispersed therein which layer is adjacent the other surface of the belt, and at least along the central portion of the belt, which layer is adapted to both protect the belt from damage by sharp objects impinging on said other surface of the belt and inhibit the growth of cuts sustained by said other surface of the belt.

2. The belt of claim 1 in which there is at said other surface a cover of rubber over the wire-containing layer.

3. The belt of claim 1 in which there is a relatively narrow strip of rubber on each side of the wire-containing layer, wide enough to prevent exposure of ends of wire at the edge of the belt.

4. A conveyor belt with a pulley cover of rubber at the pulley surface, a top cover of rubber at the other surface, a carcass of fabric enclosed in a breaker, and at least in the central portion of the belt between the breaker and the top cover a layer of rubber containing 10 to 15 percent by weight of short lengths of wire dispersed throughout the rubber which layer protects the carcass from damage by sharp objects.

5. The belt of claim 4 in which the carcass fabric is square-woven fabric, the breaker is of cord-type fabric, there is a layer of rubber between the breaker and the wire-containing layer, the wire-containing layer contains substantially 12 percent by weight of wire, and the edges of the belt are composed entirely of rubber.

6. The belt of claim 4 in which the carcass fabric is square woven fabric and the edges of the belt are composed entirely of rubber.

7. A rubber-containing conveyor belt comprising a pulley cover at one surface of the belt and within the belt a layer parallel to said belt surface which extends the whole length of the belt, contains short lengths of wire distributed throughout it, and is uniformly spaced with respect to one edge of the belt.

References Cited by the Examiner

FOREIGN PATENTS

| 777,252 | 6/1957 | Great Britain. |
| 815,910 | 7/1959 | Great Britain. |

SAMUEL F. COLEMAN, *Primary Examiner.*

R. E. KRISHER, *Assistant Examiner.*